US012638875B2

(12) United States Patent　　　(10) Patent No.:　US 12,638,875 B2

Prabhu et al.　　　(45) Date of Patent:　May 26, 2026

(54) POWER VOLTAGE PHASE ADJUSTMENT FOR ADAPTIVE CLOCK DISTRIBUTION SYSTEM

(71) Applicant: QUALCOMM Incorporated, San Diego, CA (US)

(72) Inventors: Ashwath Prabhu, Bengaluru (IN); Palkesh Jain, Bangalore (IN); Mahesh Veeranna Yatagiri, Bangalore (IN); Dipti Ranjan Pal, Irvine, CA (US)

(73) Assignee: Qualcomm Incorporated, San Diego, CA (US)

( * ) Notice: Subject to any disclaimer, the term of this patent is extended or adjusted under 35 U.S.C. 154(b) by 87 days.

(21) Appl. No.: 18/909,356

(22) Filed: Oct. 8, 2024

(65) Prior Publication Data

US 2026/0099167 A1　　Apr. 9, 2026

(51) Int. Cl.
　　*G06F 1/08*　　　(2006.01)
　　*G06F 11/30*　　(2006.01)

(52) U.S. Cl.
　　CPC ............ *G06F 1/08* (2013.01); *G06F 11/3062* (2013.01)

(58) Field of Classification Search
　　CPC ..................................... G06F 1/12; G06F 1/10
　　See application file for complete search history.

(56) References Cited

U.S. PATENT DOCUMENTS

| | | | | |
|---|---|---|---|---|
| 6,223,297 | B1 * | 4/2001 | Inoue ........................ | G06F 1/08 |
| | | | | 713/322 |
| 11,402,413 | B1 | 8/2022 | Mohan et al. | |
| 2018/0032124 | A1 * | 2/2018 | Fukuoka ............... | G06F 1/3296 |
| 2018/0304829 | A1 * | 10/2018 | Yanagawa ................. | B60L 3/04 |
| 2020/0028514 | A1 | 1/2020 | Hanke et al. | |
| 2022/0413543 | A1 * | 12/2022 | Mehra ................ | H03K 5/00006 |
| 2023/0136561 | A1 * | 5/2023 | Boujamaa ................. | G06F 1/08 |
| | | | | 375/376 |
| 2023/0324947 | A1 * | 10/2023 | Mehra ..................... | G06F 1/324 |

OTHER PUBLICATIONS

International Search Report and Written Opinion—PCT/US2025/045373—ISA/EPO—Nov. 26, 2025.

* cited by examiner

*Primary Examiner* — Phil K Nguyen

(74) *Attorney, Agent, or Firm* — Loza & Loza, LLP

(57)　　　　　ABSTRACT

The phase of a power voltage is adjusted for an adaptive clock distribution system. In one example, an apparatus includes a filter circuit coupled to one or more active circuits to receive a sensed voltage and configured to generate a tuned sensed voltage by delaying the tuned sensed voltage. An adaptive clock distribution circuit is coupled to the clock signal source to receive the clock signal and coupled to the one or more active circuits to provide the clock signal to the one or more active circuits, wherein the adaptive clock distribution circuit is further coupled to the filter circuit to receive the tuned sensed voltage, and configured to detect a voltage droop of the tuned sensed voltage, and to reduce the frequency to the one or more active circuits in response to the voltage droop.

20 Claims, 6 Drawing Sheets

600

POWER VOLTAGE PHASE ADJUSTMENT FOR ADAPTIVE CLOCK DISTRIBUTION SYSTEM

TECHNICAL FIELD

Disclosed aspects relate to adaptive clock distribution systems for computing systems, in particular, to adjusting the phase of the power voltage.

BACKGROUND

Integrated circuit (IC) chips rely on a stable, regulated supply voltage (Vdd) to operate correctly. The switches, capacitors, resistors, inductors, and other components within IC chips are all affected by the voltage level that is provided for their operation. At the same time, the various components within an IC chip can require different amounts of power at different times. The power requirements change as demands on the IC chip change and, in some cases, as different areas of the chip are turned on or off in order to save power. Recent designs may allow a portion of a chip to run in a high power state or a high frequency state for a short amount of time and then reduce that power state in order to lower the operating temperature or after an operation is completed.

It is difficult for a power supply, e.g., a power management integrated circuit (PMIC) or voltage regulated supply (VRS) to maintain a constant voltage while the power consumption changes. The power consumption may increase very rapidly at different parts of the chip at different times causing the suppled voltage to droop. The magnitude of a voltage droop at a particular clocked circuit can vary with the interaction of capacitive and inductive parasitics at the board, package, and die, inter alia, in response to current and voltage changes. As the power consumption varies across the chip, the impact of a voltage droop will also vary across the chip in a way that is difficult to predict.

BRIEF SUMMARY

The following presents a summary of one or more implementations in order to provide a basic understanding of such implementations. The invention is defined by the independent claims. More particular examples are set out in the dependent claims. Examples and aspects that do not fall within the scope of the claims are merely examples used for explanation of the invention. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example, an apparatus includes a clock signal source configured to generate a clock signal for one or more active circuits of an integrated circuit, the clock signal having a voltage and a frequency. a clock signal source configured to generate a clock signal for one or more active circuits of an integrated circuit, the clock signal having a voltage and a frequency. A filter circuit is coupled to the one or more active circuits to receive a sensed voltage from the one or more active circuits and is configured to generate a tuned sensed voltage by delaying the tuned sensed voltage with respect to the sensed voltage from the one or more active circuits. An adaptive clock distribution circuit is coupled to the clock signal source to receive the clock signal and coupled to the one or more active circuits to provide the clock signal to the one or more active circuits, wherein the adaptive clock distribution circuit is further coupled to the filter circuit to receive the tuned sensed voltage, and configured to detect a voltage droop of the tuned sensed voltage, and to reduce the frequency to the one or more active circuits in response to the voltage droop.

In another example a method includes receiving a clock signal at an adaptive clock distribution circuit, the clock signal having a voltage and a frequency, receiving a sensed voltage of the clock signal from one or more active circuits, and delaying the sensed voltage at a filter circuit to provide a tuned sensed voltage. The method further includes detecting a voltage droop of the tuned sensed voltage and reducing the frequency of the clock signal in response to the detecting the voltage droop. The method further includes providing the clock signal to the one or more active circuits to drive the one or more active circuits at the voltage and the frequency.

In another example, a computing system includes an integrated circuit having at least one core, the core including one or more active circuits, a clock signal source configured to generate a clock signal for the one or more active circuits of the core, the clock signal having a voltage and a frequency, and a voltage distribution circuit coupled to the clock signal source configured to distribute the clock signal to the core. A filter circuit is coupled to the one or more active circuits to receive a sensed voltage of the clock signal from the one or more active circuits and configured to delay the sensed voltage to provide a tuned sensed voltage. An adaptive clock distribution circuit is coupled to the clock signal source to receive the clock signal and coupled to the voltage distribution circuit to provide the clock signal to the one or more active circuits, the adaptive clock distribution circuit coupled to the filter circuit to receive the tuned sensed voltage from the filter circuit, and configured to detect a voltage droop of the tuned sensed voltage, and to reduce the frequency for the one or more active circuits in response to the voltage droop.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

Adaptive Clock Distribution (ACD) circuits are sometimes used between a clock source and the active circuits of an active subsystem of a chip in order to mitigate voltage droops. The ACD circuit senses the voltage at the active circuits and compares it to the voltage provided by the PMIC. When the active circuit voltage droops, the ACD circuit is configured to adjust the supplied clock rate to reduce the power drawn by the active circuits. Since most of the power consumed by an integrated circuit is caused by or is a direct result of switching at the active transistors, a reduction in the clock rate that controls the rate of switching will reduce the power draw.

The sensed voltage from the active circuits may be delayed relative to the voltage at the active circuits that is provided by the PMIC or other power source. The delay may be observed as a phase misalignment such that peaks and valleys of the sensed voltage are out of phase with the voltage at the active circuits. The delay arises from many different factors including the inherent inductance, capacitance, and resistance of the power pathways and circuitry from the PMIC to the active circuits and back. In part, these characteristics of the pathways and circuitry operate as a resistance/capacitance (RC) filter to cause a filter delay. When the phase is not aligned, then the ACD circuit may not be able to accurately detect or measure a voltage droop in the sensed voltage.

As described herein, a tuner in the power grid is coupled to one or more active circuits of the integrated circuit and aligns the phase of the sensed voltage with the phase of the voltage at the active circuits. The Adaptive Clock Distribution circuit receives the phase-aligned sensed voltage to more accurately respond to droops in the voltage of the sensed voltage. The tuning may be based on fixed parameters, or the tuning may be dynamic during run time to respond to the variations in the system over time. A more accurate delay may allow for a more accurate voltage droop determination which may provide for a more accurate response by the ACD circuit to stress at a hotspot. In some aspects, this may mean that the ACD circuit activates a clock divider at more appropriate times as described in more detail below.

Figure 1:
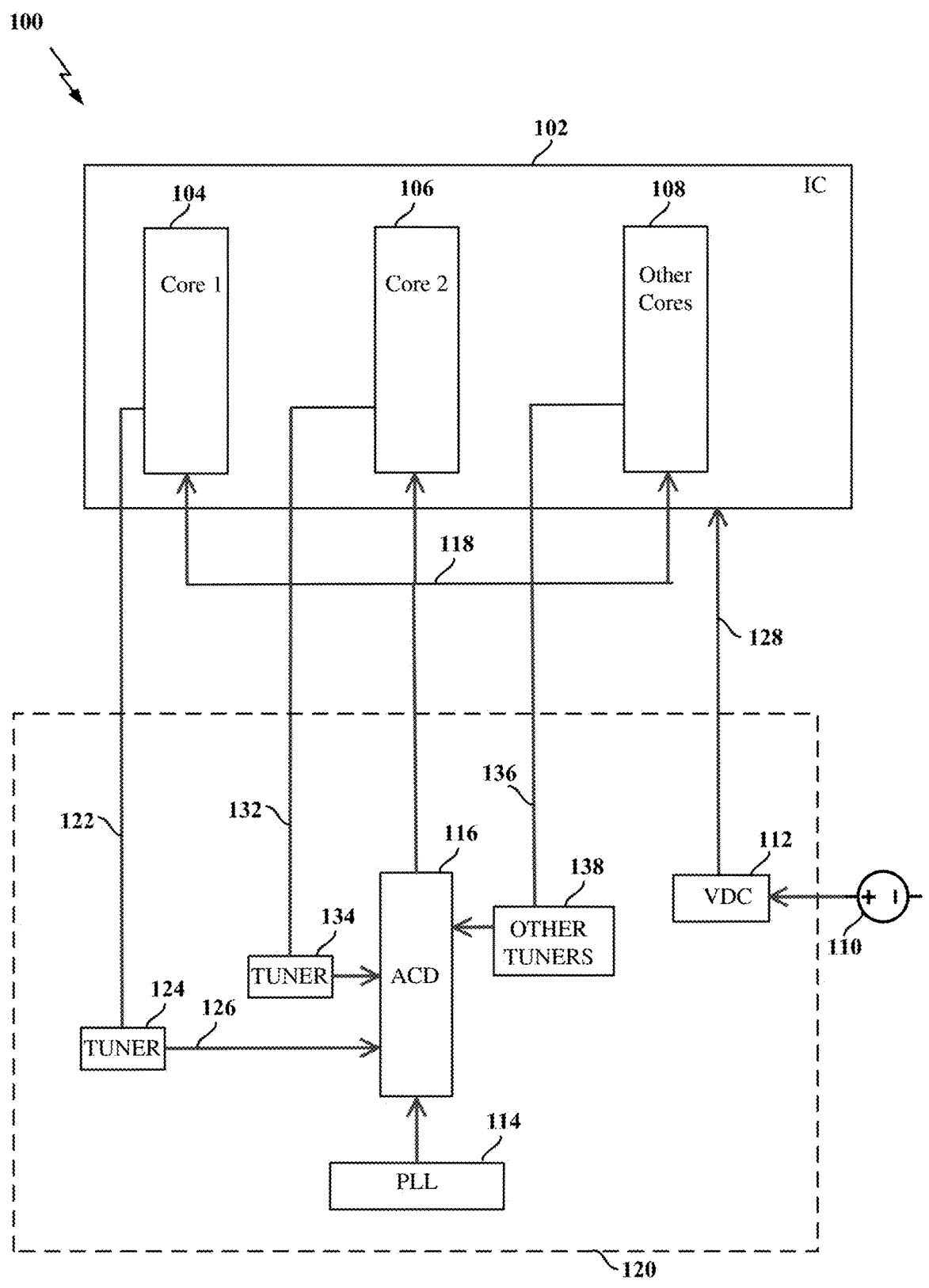
FIG. 1 is a block diagram of a computing system with an integrated circuit and a power distribution system according to aspects of the present disclosure.

FIG. 1 is a block diagram of a computing system 100 with an active subsystem 102 and a power distribution system 120. The active subsystem 102 may be in the form of a processor, co-processor, sensor, controller, etc. with at least three cores, a first core 104, a second core 106, and other cores 108. It should be noted that the cores may be at different locations within an IC, or be in different IC's, and may be operated at the same or different clock speeds. In aspects, the active subsystem 102 and the power distribution system 120 are in the same die and within the same IC, which is referred to as a system on a chip (SoC). A power supply 110, e.g., a PMIC, supplies power to the power distribution system 120 that provides power and clock frequencies to drive the active subsystem 102. The power distribution system 120 includes a voltage distribution circuit (VDC) 112 that receives power from the power supply 110. The VDC 112 has a voltage distribution network to distribute the power in the form of one or more direct current (DC) voltages, including one DC voltage 128 to each of the first core 104, the second core 106 and the other cores 108. The power distribution system 120 includes a Phase-Locked Loop (PLL) 114 that is coupled to the power supply 110 to provide a clock signal to an adaptive clock distribution (ACD) circuit 116. The PLL 114 is a clock signal source for at least a portion of the computing system 100. Multiple PLLs (not shown) may be used as clock signal sources to different parts of the computing system or to different cores, depending on the implementation. The ACD circuit 116 adapts the clock signal from the PLL 114 for application to each core through a clock distribution network 118.

The at least three cores each contain one or more active circuits. The present description is presented in the context of active circuits because active circuits consume power and generate heat, however, similar structures and techniques may be applied to inactive circuits. The one or more active circuits may be within a core, a macro, a subsystem, or another structure of an IC. Accordingly, the cores of FIG. 1 represent any such structure that includes one or more active circuits. A group of nearby active circuits may be operating, for a time, at a higher than average temperature due to higher workloads, faster switching times or other factors. The location of such a group of nearby active circuits may be referred to as a hotspot. Hotspots may be identified for the application of thermal mitigation, such as dividing the input clock. The one or more active circuits may be on one or more different dies to form a system in a package (SiP) or a system on a chip (SoC). The power distribution system 120 may be on the same die, the same package, or a different package to suit the thermal and power requirements of the computing system.

The first core 104 has a sensed voltage line 122 that senses the power at the first core 104 for a first tuner 124. The second core 106 has a second sensed voltage line 132 that senses the power of the clock signal at the second core 106 for a second tuner 134. The other cores 108 have one or more other sensed voltage lines 136 that provide sensed voltage of the clock signal for the other cores 108 to other tuners 138. The first tuner 124 provides a first tuned sensed voltage 126 to the ACD circuit 116. The second tuner 134 and the other tuners 138 provide respective tuned sensed voltages to the ACD circuit 116. The ACD circuit 116 adapts the clock signal from the PLL in response to the tuned sensed voltages.

The ACD circuit 116 may be placed near the PLL 114 that provides the clock signal to e.g. the first core 104 of the active subsystem 102. This allows the ACD circuit 116 to sense and control the behavior of the PLL 114. The first sensed voltage line 122 from the first core 104 allows the ACD circuit 116 to detect a voltage droop at the first core 104. In response to a voltage droop, the ACD circuit 116 may reduce the frequency of the clock signal to slow down the first core 104 and allow one or more active circuits of the first core 104 to operate properly at the lower voltage. Any of a variety of suitable approaches may be used to reduce the clock signal frequency. In some aspects, the ACD circuit 116 may modify the operation of the PLL 114. In some aspects, a delay line may delay clock pulses. In other aspects, one or more clock dividers (see e.g. FIG. 2) may be used to reduce the clock signal frequency differently to different parts of the active subsystem 102. Different groups of one or more active circuits may have different voltage supplies and different clock sources with different ACD circuits.

In practice, the sensed voltage line 122 will differ from the DC voltage 128 due to the variations in the load provided by the respective core. When a significant number of circuits switch or perform another action that requires higher power, then the voltage at the one or more active circuits will droop. When a significant number of circuits are inactive, the voltage may recover or even surge above the supplied DC voltage 128. In many aspects, the one or more active circuits switch on a clock pulse, e.g. a leading or trailing edge of the clock pulse or both. As a result, the voltage variations in the sensed voltage have a cycle that is related to the frequency of the clock signal from the clock distribution circuit. Depending on the configuration of the one or more active circuits, the cycle may be equal to the clock frequency, one half the clock frequency, double the clock frequency or related by another scaling factor. The amplitude of the voltage variations is related to the activity of the one or more active circuits at the respective clock pulse. If the operation of the active circuits varies, then the voltage amplitude will be different at different cycles. The cyclical voltage variation from the supplied DC voltage is referred to as supply noise.

The phase of the voltage variation in the sensed voltage line 122 will be delayed as compared to the phase of the voltage variations at the ACD circuit 116. In other words, the sensed voltage received from the first sensed voltage line 122 at the ACD circuit 116 is not time aligned with the voltage output from the VDC 112 and which powers the ACD circuit 116. This affects the operation of the ACD circuit 116. The phase mismatch may occur due to the inherent resistance and capacitance in the path from the VDC 112 to the first core 104. The inherent characteristics of this path form an effective RC filter that delays the signal. Accordingly, the ACD circuit 116 may take a wrong action. As an example, the ACD circuit 116 may increase a clock signal frequency instead of decreasing the clock signal frequency when there is a droop at the first core 104 or at any other hotspot of the active subsystem 102. This wrong action may cause a timing violation or worse.

As described herein, the phase mismatch is corrected by the tuners, e.g., the first tuner 124 between the first sensed voltage line 122 and the ACD circuit 116. The first tuner 124 applies a filter circuit delay to the sensed voltage of the first sensed voltage line 122 to align a phase of the supply noise on the sensed voltage line 122 with the phase of the supply noise at the VDC 112. This gives a more accurate action by the ACD circuit 116 in response to the voltage droop. The second tuner 134 aligns the sensed voltage of the second sensed voltage line 132 and the other tuners 138 align the sensed voltage of the other sensed voltage lines 136.

Figure 2:
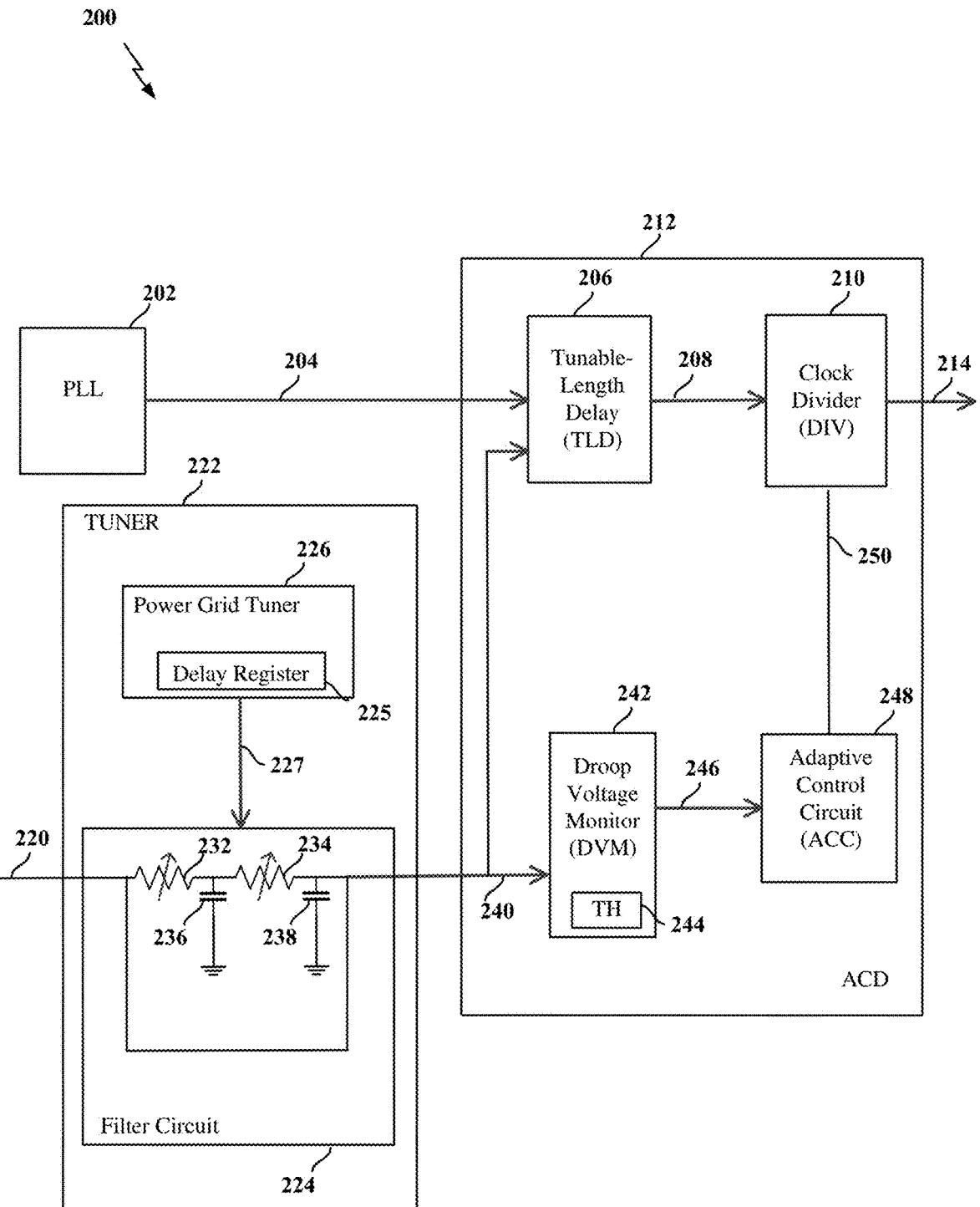
FIG. 2 is a block diagram of a power distribution system suitable for providing power and clock signals to an active subsystem according to aspects of the present disclosure.

FIG. 2 is a block diagram of a power distribution system 200 suitable for providing clock signals to an active subsystem 102 as shown, e.g., in FIG. 1. The power distribution system 200 includes a PLL 202 that sends a PLL clock signal 204 to an ACD circuit 212. The ACD circuit 212 sends an adjusted clock signal 214 to a clock distribution network, e.g., the clock distribution network 118 of FIG. 1. A tuner 222 receives a sensed voltage 220 from one or more active circuits of an active subsystem and tunes the sensed voltage

220 by adjusting its phase before providing it as a tuned sensed voltage 240 to the ACD circuit 212.

The ACD circuit 212 includes a clock divider 210 to reduce the clock frequency in response to a voltage droop in the tuned sensed voltage 240. A voltage droop in an active subsystem may be caused, for example, by a change in current event (di/dt event) resulting from a sudden current draw by clocked circuits in the one or more active circuits. In an example larger IC, a large number of active circuits and high-speed memory may be integrated, and a power distribution network can be very large. A large power distribution network may have significant impedance in the paths that it uses to distribute the power through the computing system. A large isolated di/dt event (e.g., power supply noise) travels through this significant impedance. di/dt refers to a quick change in the current flow and is referred to as supply noise. The noise appears as variations in the amplitude of the sensed voltages from the one or more active circuits. Due to the impedance, noise in one region of the power distribution network is decoupled from other remote regions. As a result, a voltage droop in one region of the power distribution network may be delayed and may decrease in magnitude before arriving in another region of the power distribution network.

The ACD circuit 212 may be configured to control the clock divider 210 by activating the clock divider 210 to change the frequency of the adjusted clock signal 214 provided to the active circuits after a predetermined number of clock cycles, e.g., approximately three (3) clock cycles after detecting an indication of a voltage droop at a droop voltage monitor (DVM) 242. Active circuit errors may occur during those three clock cycles as a result of the increased delay in logic gates of the active circuits. Therefore, the ACD circuit 212 also includes a tunable-length delay (TLD) circuit 206 that is also coupled to the tuned sensed voltage to immediately stretch the clock period until the clock divider 210 is able to respond to the voltage droop. The TLD circuit 206 includes a delay path formed of e.g., logic gates through which the PLL clock signal 204 from the PLL 202 to the ACD circuit 212 propagates. The TLD is powered by the tuned sensed voltage so that it responds to the voltage droop that is sensed at the active circuits.

During the predetermined number of clock cycles, e.g., 3 or more clock cycles, that the clock divider 210 uses to respond to the voltage droop and reduce the frequency of the adjusted clock signal 214, the TLD circuit 206 is configured to stretch the period of the adjusted clock signal 214 provided to the active circuits. This compensates for the voltage droop at the one or more active circuits and reduces the possible errors in the operation of the active circuits. In some aspects, as the voltage droop occurs, the drive strength of the TLD circuit 206 is reduced and the propagation delay through the TLD circuit 206 increases. This increase in propagation through the TLD circuit 206 increases (i.e., stretches) the period of the PLL clock signal 204 to generate a delayed clock signal 208 that is sent from the TLD circuit 206 and received at the clock divider 210 to generate the adjusted clock signal 214. If the TLD circuit 206 experiences the same voltage droop in supply voltage VDD as the one or more active circuits, the period of the adjusted clock signal 214 is stretched enough to compensate for the increased delay in the active circuits and errors are thus avoided.

As shown, the logic gates of the TLD circuit 206 receive the same power supply voltage as the logic gates of the active circuits but delayed by the tuner 222 as the tuned sensed voltage 240. Thus, in the event of a voltage droop that increases delay in the logic gates of the active circuits, the delay of the clock signal through the logic gates of the TLD circuit 206 is also increased by a similar amount. In this way, the TLD circuit 206 stretches the clock period by an amount needed to compensate for the increased delay in the active circuits resulting from the voltage droop. The adjusted clock signal 214 supplied to the one or more active circuits is based on the PLL clock signal 204 generated in the PLL 202.

When there is a voltage droop in the sensed voltage 220, propagation delays in the one or more active circuits may increase due to a reduction in drive strength caused by the voltage droop, but the period (i.e., frequency) of the adjusted clock signal 214 based on the PLL clock signal 204 supplied by the PLL 202 may not change enough through the TLD circuit 206 so that the clock divider 210 is then activated. In this regard, if propagation delays in the active circuits increase, operations of the active circuits may not complete within an available time of a clock period of the adjusted clock signal 214, and errors will occur in the active circuits. To compensate for the increased delays in the active circuits in the presence of a voltage droop in the sensed voltage 220, the ACD circuit 212 activates the clock divider 210 to reduce a frequency of the adjusted clock signal 214 in response to a voltage droop indication 246 generated by the droop voltage monitor 242 indicating a voltage droop. The clock divider 210 may simply reduce the clock frequency in half or it may be capable of multiple different divisions.

The voltage droop indication 246 is coupled from the droop voltage monitor 242 to an adaptive control circuit (ACC) 248 that provides a divider indication 250 to the clock divider 210. In aspects, the droop voltage monitor 242 of the adaptive clock distribution circuit 212 is configured to detect a voltage droop by comparing the difference between the supply voltage, the original DC voltage from a PMIC or power distribution network, and the voltage of the tuned sensed voltage 240 to a threshold 244. The comparison provides a difference between the supply voltage and the voltage of the tuned sensed voltage 240. The threshold 244 prevents a corrective action for only small differences between the two signals, in particular if the tuned sensed voltage 240 is less than the supply voltage by less than the threshold. If the difference between the supply voltage and the tuned sensed voltage 240 exceeds the threshold 244, then the voltage droop indication 246 is sent from the droop voltage monitor 242 to the adaptive control circuit 248. In aspects, the voltage is compared for a predetermined number of clock cycles, e.g., for three clock cycles, and the voltage droop indication 246 is sent only after the threshold 244 is exceeded for the predetermined number of consecutive clock cycles. In aspects, two, four or more clock cycles must be exceeded. The predetermined number of clock cycles may be varied to suit the response characteristics of the computing system.

A voltage droop is indicated when the sensed voltage 220 is less than the supply voltage. However, as described herein, sensed voltage 220 and the supply voltage may both be subject to cyclical variations based on the activity at a hotspot. The DVM 242 does not directly compare these two signals. It compares the tuned sensed voltage 240 which has been delayed to be phase aligned to the supply voltage noise. The sensed voltage 220 and the supply voltage may not be aligned in two ways. First, the voltage droop causes an amplitude mismatch, where the amplitude is a voltage amplitude. The sensed voltage 220 typically has a lower amplitude than the supply voltage and this applies to voltage peaks being lower and voltage valleys being higher. The ACD circuit 212 is configured to address the amplitude mismatch. This is not described herein in order to not obscure this description. Second, the significant impedance in a large power distribution network and the distance through which a large isolated di/dt event (e.g., due to noise) travels may cause a phase mismatch. A sensed voltage 220 is typically delayed in phase relative to the supply voltage. The tuner 222 is configured to address the phase mismatch. The phase mismatch is caused, at least in part, by RC effects within the circuits and physical paths of the power distribution network and cores. Accordingly, as shown in FIG. 1, there may be different tuners for different cores.

The tuner 222 receives the sensed voltage 220 from an active circuit, e.g., a core, macro, subsystem, or other source as described above into a filter circuit 224. The filter circuit 224 adds a filter circuit delay to the waveform of the sensed voltage 220. The filter circuit delay of the sensed voltage 220 is configured to align a phase of the sensed voltage and a phase of the supply voltage. The filter circuit 224 is shown as an RC filtering circuit, however other delay circuit configurations may be used.

The filter circuit features two series resistors 232, 234, and two parallel capacitors 236, 238 coupled between the resistors in a loop as an example architecture. In another aspect, the filter circuit has a series of RC delay elements with multiple tapping points between respective delay elements. The first capacitor 236 has a node coupled on one side between the first resistor 232 and the second resistor 234. The second capacitor 238 has a node coupled on one side between the second resistor 234 and the first resistor 232. The other node of each capacitor is grounded or coupled to another common reference voltage. The RC components are in a loop and an output of the loop at the first node of the second capacitor 238 is taken as the tuned sensed voltage 240. The tuned sensed voltage 240 is coupled to the droop voltage monitor 242, as mentioned above. More or fewer resistors and capacitors may be used to suit different implementations.

A power grid tuner 226 is coupled to the filter circuit 224 to control the parameters of the filter circuit 224 to control the amount of filter circuit delay. In this way, the filter circuit has a variable delay. In some aspects, one or both of the first resistor 232 and the second resistor are variable resistors and the power grid tuner 226 adjusts the resistance values of the first resistor 232 and the second resistor 234 to adjust the filter circuit delay. In some aspects, the variable resistors represent a series of resistors and different numbers of resistors may be selected to provide the desired resistance. In other aspects, the capacitance values are adjusted instead of, or in addition to the resistance values. In some aspects, a number of delay elements may be selected from a series using one of multiple taps to select a desired delay.

The power grid tuner 226 generates a control signal 227 that it transmits to the filter circuit 224 to adjust the variable delay of the filter circuit 224 to control the degree of coupling of the noise between the active circuits and the ACD circuit 212, including the TLD circuit 206. The control signal 227 may be generated from a value in a delay register 225 of the power grid tuner 226. The value in the delay register may be preprogrammed based on operations in a test environment or generated by a connected processor in the field or in another way.

In another aspect, the resistors are configured to a constant value before installation. In some aspects this may be described as programming the delay into the filter circuit 224 at the factory. The values may be based on simulation, sampling, or operational testing. The resistors may then be trimmed, cut, disconnected, or adjusted in another suitable way to obtain a desired resistance value for an expected phase shift for the circuit architecture and its expected operating parameters.

In some aspects, the filter circuit may be calibrated by the power grid tuner for a phase correction with respect to the supply voltage. In some aspects, the power grid tuner is configured as a feedback element to adjust the filter circuit delay of the tuned sensed voltage 240. An optimal phase correction may be selected to align the peaks or valleys of the sensed voltage 220 with the supply voltage. In some aspects, the peaks or valleys represent a hotspot supply noise. The phase aligned signal from the filter circuit 224 provides an improved clock signal stretch from the TLD circuit 206 by correcting the supply noise signal phase with distant hotspot signal phase.

The filter circuit delay may be adjusted by the power grid tuner 226 in real time based on sweeping the delay of the filter circuit through a range of values and comparing the voltage droop or the amplitude of the active circuit supply noise in the sensed voltage 220 for different delay values. The RC effects that, in part, cause the delay in the sensed voltage 220 vary with frequency, voltage, temperature, and other operating conditions of the power distribution network, the respective core, and the power rails. In some aspects, the power grid tuner 226 may sweep through different values and select a setting that shows the best minimum combined voltage at suitable intervals.

Figure 3:
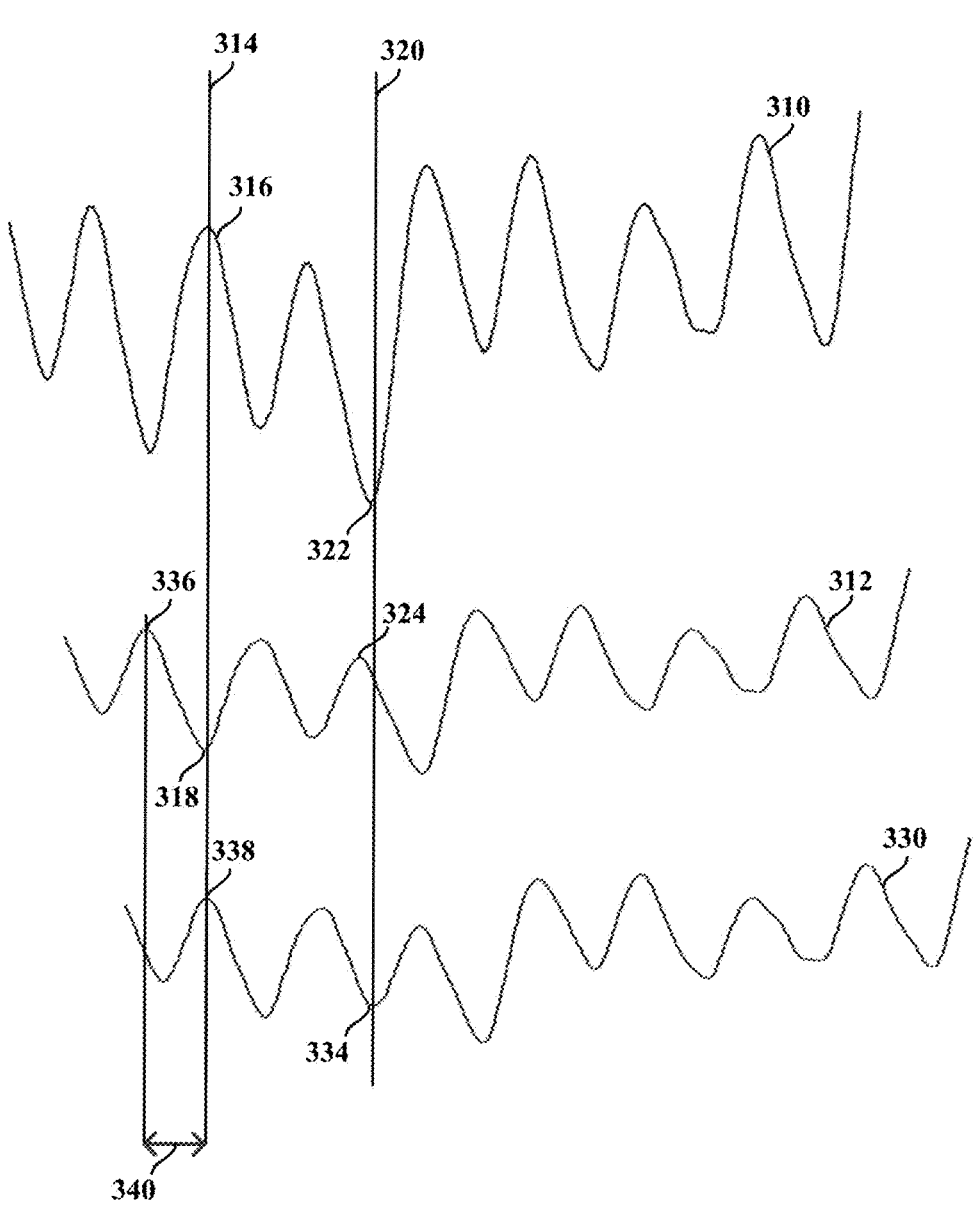
FIG. 3 is a timing diagram of amplitude on the vertical axis over time on the horizontal axis of an example clock signal and sensed voltage according to aspects of the present disclosure.

FIG. 3 is a timing diagram of amplitude on the vertical axis over time on the horizontal axis of an example supply voltage and sensed voltage to show voltage droop and delay tuning by the filter circuit. A supply voltage 310 at active circuits is shown as an amplitude on the vertical axis against time on the horizontal axis. The supply voltage 310 may correspond to the supply voltage, DC voltage 128 of FIG. 1. The supply voltage 310 is subject to power demand variations causing variations in the voltage amplitude over time. The active circuit noise is represented as these variations from a flat constant DC signal voltage. A sensed voltage 312 is shown as a vertical amplitude against the same time scale on the horizontal axis. The sensed voltage may correspond to the sensed voltage 220 of FIG. 2. A tuned sensed voltage 330 is shown as a vertical amplitude also against the same horizontal time scale. The tuned sensed voltage may correspond to the tuned sensed voltage 240 of FIG. 2. It may be seen by comparison that the supply voltage 310 has greater amplitude and higher grade slopes at the active circuits than the sensed voltage 312 at the ACD circuit, e.g., the ACD circuit 116 of FIG. 1. The curve flattening and the distortion shown in the sensed voltage 312 is caused by the path from the one or more active circuits. It may also be seen that the frequency is the same between the supply voltage 310 at the active circuits and the sensed voltage 312 at the ACD circuit.

At time 314, the supply voltage 310 has a peak 316. The sensed voltage 312 at time 314 has a valley 318. If the sensed voltage 312 were applied to the TLD and to the droop voltage monitor, then the TLD may cause a timing violation at the active circuits and the droop voltage monitor would be inaccurate. The sensed voltage 312 has substantially lower voltage in the valley 318 at time 314 than the supply voltage 310 at its peak 316. In the same way, at time 320, the supply voltage 310 has a valley 322 and the sensed voltage 312 is near a peak 324. At time 320 the sensed voltage 312 has a higher voltage than the supply voltage 310. While the supply voltage 310 and the sensed voltage 312 are shown as approximately one half cycle out of phase, this is provided only as an example. The signals may be more or less out of phase. Any such mismatched phase may cause timing violations and errors in a droop voltage monitor.

The tuned sensed voltage 330 has been delayed by about one half cycle as compared to the sensed voltage 312. A first peak 338 of the tuned sensed voltage 330 is shifted after a first peak 336 of the sensed voltage 312 by a time delay 340 that corresponds to about one-half cycle. The one-half cycle time delay 340 is combined with the one half-cycle delay of the sensed voltage 312 for a full cycle delay between a cycle of the supply voltage 310 at the active circuits and a cycle of the tuned sensed voltage 330 at the ACD circuit. As a result, the supply voltage 310 and the tuned sensed voltage 330 are time aligned with a one cycle offset. In other words, the phase of the tuned sensed voltage 330 is aligned with the phase of the supply voltage 310. This avoids timing violations at the TLD and allows for a better comparison at the droop voltage monitor 242. In particular, at time 314 the peak 316 of the supply voltage 310 is aligned roughly with a peak 338 of the tuned sensed voltage 330. The valley 322 of the supply voltage 310 is aligned with a valley 334 of the tuned sensed voltage 330 at time 320. The phase alignment is performed using a tuner 222 as shown in FIG. 2.

In other circumstances, if the sensed voltage has a greater delay, then the tuned sensed voltage may have a filter circuit delay of two or three cycles. The particular duration of the time delay 340 for the tuned sensed voltage 330 may be adapted to suit the delay of the sensed voltage 312. In some circumstances, the delay of the sensed voltage 312 may be less, such that the time delay 340 of the tuned sensed voltage 330 is greater to result in a full cycle from the supply voltage 310. In other circumstances, the delay of the sensed voltage 312 may be greater, such that the delay of the tuned sensed voltage is less than one half-cycle difference between the sensed voltage 312 and the tuned sensed voltage 330. The filter circuit may have a fixed filter circuit delay in order to align the phases under substantially constant operating conditions. In other aspects, the filter circuit may have a variable filter circuit delay to adjust the phase alignment of the tuned sensed voltage under varying conditions. While the tuned sensed voltage 330 and the supply voltage 310 are shown as very closely aligned, the phase alignment may be less accurate and still provide substantial benefits.

Figure 4:
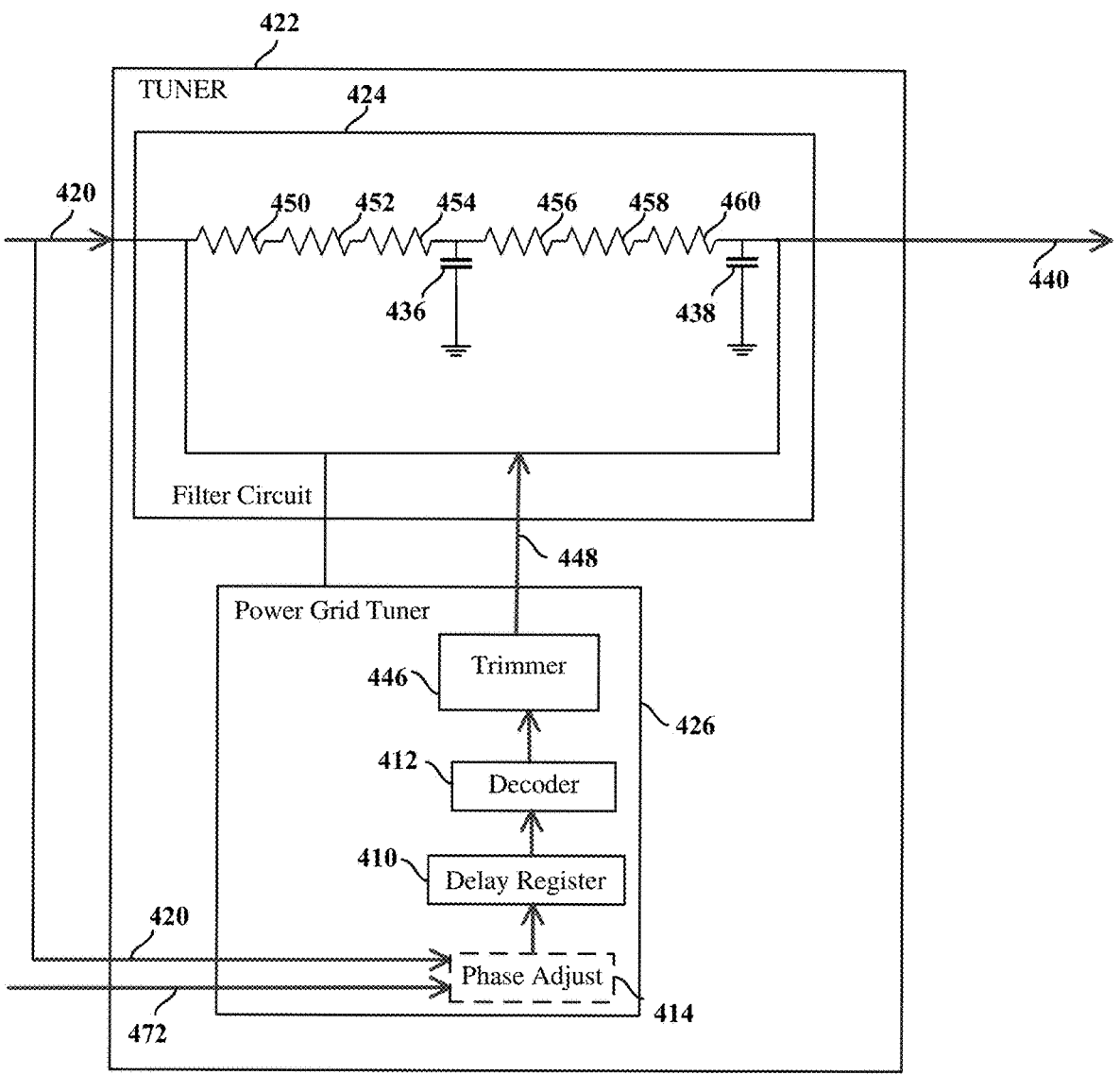
FIG. 4 is a diagram of a tuner with a trimmable resistance in a filter circuit according to aspects of the present disclosure.

FIG. 4 is a diagram of a tuner 422 with a trimmable resistance in a filter circuit 424. The tuner 422 receives a sensed voltage 420 from one or more active circuits of an active subsystem. The tuner delays the sensed voltage 420 in the filter circuit 424 and provides a tuned sensed voltage 440 to an ACD circuit (not shown) or other circuit as an input to a TLD, droop voltage monitor, and other components, as described e.g. in the context of FIG. 2.

The tuner 422 receives the sensed voltage 420 from an active circuit, e.g., a core, macro, subsystem, or other source as described above into the filter circuit 424. The filter circuit 424 adds a delay to the waveform of the sensed voltage 420 to produce the tuned sensed voltage 440. The delay of the sensed voltage 420 is configured to align a phase of the tuned sensed voltage 440 to the supply voltage at the active circuits. The tuned sensed voltage 440 from the tuner 422 will be delayed with respect to the supply voltage by approximately an integer number of cycles. The filter circuit 424 is shown as an RC filtering circuit, however other delay circuit configurations may be used.

The filter circuit features a first set of three series resistors 450, 452, 454 and a second set of three series resistors 456, 458, 460, and two parallel capacitors 436, 438 coupled between the resistors in a loop. The first capacitor 436 has a node coupled on one side between the first set of resistors 450, 452, 454 and the second set of resistors 456, 458, 460. The second capacitor 438 has a node coupled on one side between the second set of resistors 456, 458, 460 and the first set of resistors 450, 452, 454. The other node of each capacitor is grounded or coupled to another common reference voltage. The RC components are in a loop and an output of the loop at the first node of the second capacitor 438 is taken as the tuned sensed voltage 440. The tuned sensed voltage 440 is coupled to an ACD, as mentioned above. More or fewer resistors and capacitors may be used to suit different implementations. The RC components of resistors and capacitors may represent a selectable series of delay elements. The delay elements may be selected using taps between the resistors or delay elements or in another way.

A power grid tuner 426 is coupled to the filter circuit 424 to control the parameters of the filter circuit 424 to control the amount of delay. In this way the delay provided by the filter circuit may be configured and set based on the characteristics of the power distribution network and sensed voltage path from the active circuits. The power grid tuner 426 includes a trimmer 446. The trimmer 446 generates a trim control signal 448 that connects or shorts out one or more of the first set of resistors 450, 452, 454 and one or more of the second set of resistors 456, 458, 460. The change in the resistors, changes the RC value of the filter circuit to change the delay that is applied to the tuned sensed voltage 440.

While two sets of three resistors are shown, there may be more, or fewer resistors and the resistors and capacitors may be coupled in different ways to achieve the intended delay. In other aspects, the capacitance values are adjusted instead of, or in addition to the resistance values.

In some aspects, a delay register 410 contains one or more values that are used to set the delay. The delay register 410 is coupled to a decoder 412 that reads the values of the delay registers and decodes the one or more values. The decoded values are provided from the decoder 412 to the trimmer 446 which may include one or more logic gates to generate the control signal 448 which selects the resistors or tapping points in the filter circuit. The control signal 448 may have one or more lines to select multiple resistors or tapping points of the filter circuit 424. The values in the delay register 410 thereby control the delay that is applied to the sensed voltage 420 to provide the tuned sensed voltage 440.

The resistors may be trimmed after a power distribution network including the filter circuit is mounted or packaged or connected to the active circuits that generate the sensed voltage. In some aspects the resistors may be trimmed before packaging, e.g., when the active subsystem and the power distribution network are on a single die. The resistors may be fabricated with shorts to isolate or disconnect the resistors from the filter circuit. The resistors may have a constant value based on the configuration of the filter circuit and the one or more active circuits to which it is or will be coupled. In another aspect, the resistors are trimmed to a constant value before installation. The trimming may be done directly or using the delay register 410 as shown. In some aspects, the delay may be programmed into the filter circuit 424 at the factory. A test environment may include software at a test fixture to operate the computing system and write values in the delay register 410 based on testing. The values may be based on simulation, sampling, or operational testing. The resistors are trimmed, cut, disconnected, or adjusted in a suitable way to obtain a desired resistance value for a measured or an expected phase shift for the circuit architecture and its expected operating parameters.

In some aspects, the power grid tuner 426 is a feedback element that receives the sensed voltage 420 and adjusts the value of the delay register 410 at a phase adjust circuit 414. The phase adjust circuit is indicated in dashed line as an optional element. The phase adjust circuit 414 may apply different values to the delay register to find an optimal sensed voltage and thereby determine a suitable delay for the filter circuit. The phase adjust circuit 414 writes suitable values to the delay register 410 to adjust the delay and align the phase of the tuned sensed voltage to the phase of the clock signal. In some aspects, the phase adjust circuit 414 may be in the active subsystem or a connected processor that is configured to sweep through a range of different delay register values according to a predetermined sequence to control the delay of the filter circuit 424. A calibration signal 472 may be provided from an external component to the phase adjust circuit 414 to cause the phase adjust circuit to initiate a phase adjustment cycle.

Figure 5:
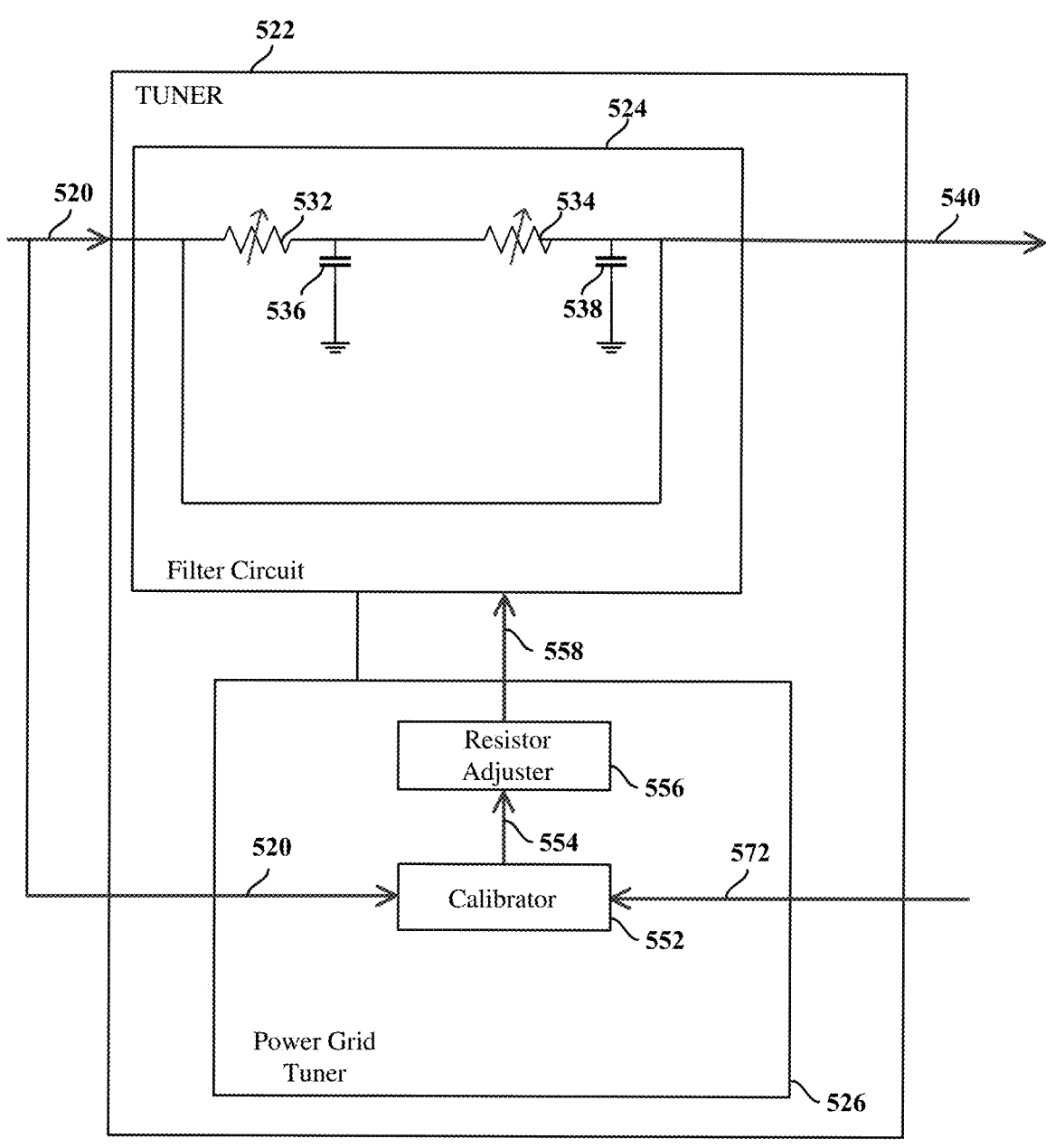
FIG. 5 is a block diagram of a tuner with a variable resistance in a filter circuit according to aspects of the present disclosure.

FIG. 5 is a block diagram of a tuner 522 with a variable resistance in a filter circuit 524. The tuner 522 receives a sensed voltage 520 from active circuits of an active subsystem. The tuner delays the sensed voltage 520 in the filter circuit 524 and sends a tuned sensed voltage 540 to an ACD circuit (not shown) for use in managing voltage droop, as described e.g. in the context of FIG. 2.

The tuner 522 receives the sensed voltage 520 from an active circuit, e.g., a core, macro, subsystem, or other source as described above into a filter circuit 524. The filter circuit 524 adds a delay to the waveform of the sensed voltage 520 to provide the tuned sensed voltage 540. The delay of the tuned sensed voltage 540 is configured to align a phase of the tuned sensed voltage 540 and a phase of a supply voltage at active circuits. The tuned sensed voltage 540 from the tuner 522 will be delayed with respect to the sensed voltage 520. The filter circuit 524 is shown as an RC filtering circuit, however other delay circuit configurations may be used.

The filter circuit features a first variable resistor 532, a second variable resistor 534, and two parallel capacitors 536, 538 coupled between the resistors in a loop. The first capacitor 536 has a node coupled on one side between the first variable resistor 532 and the second variable resistor 534. The second capacitor 538 has a node coupled on one side between the second variable resistor 534 and the first variable resistor 532. The other node of each capacitor is grounded or coupled to another common reference voltage. The RC components are in a loop and an output of the loop at the first node of the second capacitor 538 is taken as the tuned sensed voltage 540. The tuned sensed voltage 540 is coupled to e.g. a droop voltage monitor, as mentioned above. More or fewer resistors and capacitors may be used to suit different implementations.

A power grid tuner 526 is coupled to the filter circuit 524 to control the parameters, e.g. the resistance, of the filter circuit 524 to control the amount of delay. In this way the filter circuit has a variable delay through varying the resistance of the variable resistors. In some aspects, the power grid tuner 526 operates as a feedback element and has a calibrator 552 coupled to the sensed voltage 520 and to the resistor adjuster to optimize the sensed voltage 520. An optimal phase correction may be selected to align the peaks or valleys of the sensed voltage 520 with the supply voltage at the active circuits. In some aspects, the peaks or valleys represent a hotspot supply noise. The calibrator sends an adjustment signal 554 to a resistor adjuster 556 that sends a control signal 558 to the filter circuit to adjust the resistance of the first variable resistor 532 or the second variable resistor 534 or both. In some aspects, the power grid tuner 526 may sweep through different filter circuit resistance values and select a setting that shows the best minimum combined voltage at suitable intervals.

In some aspects, the calibrator 552 may include a delay register as shown in FIG. 4. The resistor adjuster 556 may include the delay register and may include a decoder and trimmer as in FIG. 4. The configuration of the circuit and register elements may be adapted to suit different implementations and system architectures.

The adjustment of the variable resistors changes the delay of the filter circuit to provide a tuned sensed voltage 540 with a changed delay. Accordingly, the delay may be adjusted by the power grid tuner 526 in real time based on measuring the sensed voltage 520. The RC effects that, in part, cause the delay in the sensed voltage 520 vary with frequency, voltage, temperature, and other operating conditions of the power distribution network, the respective core, and the power rails.

In some aspects, the capacitance values are adjusted instead of, or in addition to the resistance values. In some aspects the connected taps of a series of delay elements are modified to adjust the delay of the filter circuit. By adjusting the configuration of the filter circuit, the power grid tuner 526 adjusts the variable delay of the filter circuit 524 to control the degree of coupling of the noise between the one or more active circuits and an ACD circuit, including a tunable length delay.

Figure 6:
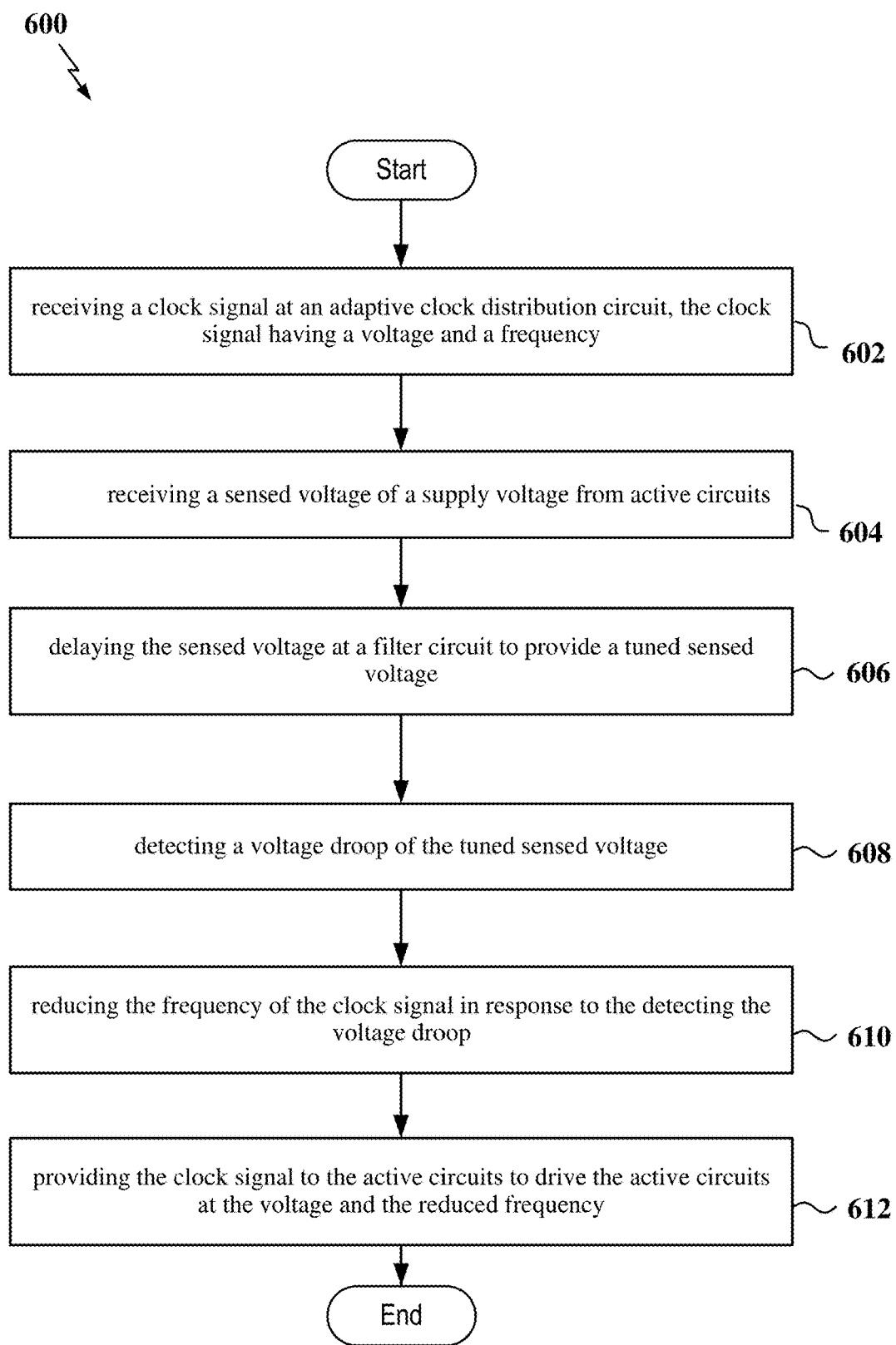
FIG. 6 is a process flow diagram of a method of power voltage phase adjustment for adaptive clock distribution according to aspects of the present disclosure.

FIG. 6 is a process flow diagram 600 of a method of power voltage phase adjustment for adaptive current distribution as described herein. At the start, there may be a system configuration and an initialization of parameters. At 602 receiving a clock signal at an adaptive clock distribution circuit is performed. In aspects, the clock signal has a voltage and a frequency. At 604 receiving a sensed voltage of a supply voltage from one or more active circuits is performed.

At 606, delaying the sensed voltage at a filter circuit is performed to provide a tuned sensed voltage. In aspects, the delaying the tuned sensed voltage is to align a phase of the tuned sensed voltage and a phase of the supply voltage at the active circuits. In aspects, the process includes adjusting the delay in response to sensed voltage. In aspects adjusting the delay comprises adjusting a variable resistor, e.g. a resistor of an RC circuit in which the variable resistor is in series between the sensed voltage and the tuned sensed voltage and the tuned sensed voltage is provided to an adaptive clock distribution circuit. In aspects a feedback element is configured to adjust the variable resistor in response to the phase of the sensed voltage and the phase of the clock signal.

At 608, detecting a voltage droop of the tuned sensed voltage is performed. In aspects, the voltage droop may be detected by comparing a difference between the supply voltage and the voltage of the tuned sensed voltage to a threshold for a predetermined number of clock cycles. At 610, reducing the frequency of the clock signal in response to the detecting the voltage droop is performed, e.g. by activating a clock divider. In aspects, the frequency of the clock signal is reduced by a tunable length delay in response to the tuned sensed voltage. At 612, coupling the clock signal to the one or more active circuits to drive the one or more active circuits at the voltage and the reduced frequency is performed.

The following provides an overview of examples of the present disclosure.

Example 1: An apparatus comprising: a clock signal source configured to generate a clock signal for one or more active circuits of an integrated circuit, the clock signal having a voltage and a frequency; a filter circuit coupled to the one or more active circuits to receive a sensed voltage from the one or more active circuits and configured to generate a tuned sensed voltage by delaying the tuned sensed voltage with respect to the sensed voltage from the one or more active circuits; and an adaptive clock distribution circuit coupled to the clock signal source to receive the clock signal and coupled to the one or more active circuits to provide the clock signal to the one or more active circuits, wherein the adaptive clock distribution circuit is further coupled to the filter circuit to receive the tuned sensed voltage, and configured to detect a voltage droop of the tuned sensed voltage, and to reduce the frequency to the one or more active circuits in response to the voltage droop.

Example 2: The apparatus of example 1, wherein the delay is configured to align a phase of the tuned sensed voltage and a phase of a supply voltage at the one or more active circuits.

Example 3: The apparatus of example 1 or 2, wherein the filter circuit has a variable delay to delay the tuned sensed voltage.

Example 4: The apparatus of example 3, wherein the filter circuit comprises RC components having a variable resistor in series between the sensed voltage and the adaptive clock distribution circuit configured to vary the delay of the tuned sensed voltage.

Example 5: The apparatus of example 4, wherein the variable resistor is configured with a constant value based on characteristics of the one or more active circuits.

Example 6: The apparatus of example 4, wherein the filter circuit comprises a feedback element configured to adjust the variable resistor in response to the sensed voltage.

Example 7: The apparatus of any one or more of the above examples, wherein the adaptive clock distribution circuit is configured to detect the voltage droop by comparing the difference between the tuned sensed voltage and the supply voltage to a threshold.

Example 8: The apparatus of example 7, wherein the adaptive clock distribution circuit is configured to reduce the frequency after detecting a voltage droop after a predetermined number of clock cycles.

Example 9: The apparatus of any one or more of the above examples, wherein the adaptive clock distribution circuit comprises a clock divider coupled between the clock signal source and the one or more active circuits and wherein the adaptive clock distribution circuit is configured to reduce the frequency by activating the clock divider.

Example 10: The apparatus of any one or more of the above examples, wherein the adaptive clock distribution circuit further comprises a tunable length delay between the clock signal source and the one or more active circuits to stretch a period of the clock signal.

Example 11: The apparatus of any one or more of the above examples, wherein the clock signal source is a phase-locked loop.

Example 12: A method comprising: receiving a clock signal at an adaptive clock distribution circuit, the clock signal having a voltage and a frequency; receiving a sensed voltage of the clock signal from one or more active circuits; delaying the sensed voltage at a filter circuit to provide a tuned sensed voltage; detecting a voltage droop of the tuned sensed voltage; reducing the frequency in response to the detecting the voltage droop; and providing the clock signal to the one or more active circuits to drive the one or more active circuits at the voltage and the frequency.

Example 13: The method of example 12, wherein the delaying the sensed voltage comprises aligning a phase of the tuned sensed voltage and a phase of a supply voltage at the one or more active circuits.

Example 14: The method of example 12 or 13, further comprising adjusting a delay of the sensed voltage.

Example 15: The method of example 14, wherein the adjusting the delaying the sensed voltage comprises adjusting a variable resistor.

Example 16: The method of any one or more of examples 12-15, wherein the detecting the voltage droop comprises comparing the difference between the tuned sensed voltage and a supply voltage to a threshold to a threshold for a predetermined number of clock cycles.

Example 17: The method of any one or more of the above examples 12-16, wherein the reducing the frequency comprises activating a clock divider at the adaptive clock distribution circuit.

Example 18: A computing system comprising: an integrated circuit having at least one core, the core including one or more active circuits; a clock signal source configured to generate a clock signal for the one or more active circuits of the core, the clock signal having a voltage and a frequency; a voltage distribution circuit coupled to the clock signal source configured to distribute the clock signal to the core; a filter circuit coupled to the one or more active circuits to receive a sensed voltage of the clock signal from the one or more active circuits and configured to delay the sensed voltage to provide a tuned sensed voltage; and an adaptive clock distribution circuit coupled to the clock signal source to receive the clock signal and coupled to the voltage distribution circuit to provide the clock signal to the one or more active circuits, the adaptive clock distribution circuit coupled to the filter circuit to receive the tuned sensed voltage from the filter circuit, and configured to detect a voltage droop of the tuned sensed voltage, and to reduce the frequency for the one or more active circuits in response to the voltage droop.

Example 19: The computing system of example 18, wherein the filter circuit comprises variable resistors and wherein the variable resistors are variable in response to the sensed voltage.

Example 20: The computing system of example 19, wherein the filter circuit comprises a power grid tuner configured to adjust the variable resistors to align a phase of the tuned sensed voltage and a phase of a supply voltage at the one or more active circuits.

It is to be appreciated that the present disclosure is not limited to the exemplary terms used above to describe aspects of the present disclosure. Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a clock signal source configured to generate a clock signal for one or more active circuits of an integrated circuit, the clock signal having a voltage and a frequency;
a filter circuit coupled to the one or more active circuits to receive a sensed voltage from the one or more active circuits and configured to generate a tuned sensed voltage by delaying the tuned sensed voltage with respect to the sensed voltage from the one or more active circuits; and
an adaptive clock distribution circuit coupled to the clock signal source to receive the clock signal and coupled to the one or more active circuits to provide the clock signal to the one or more active circuits, wherein the adaptive clock distribution circuit is further coupled to the filter circuit to receive the tuned sensed voltage, and configured to detect a voltage droop of the tuned sensed voltage, and to reduce the frequency to the one or more active circuits in response to the voltage droop.

2. The apparatus of claim 1, wherein the delay is configured to align a phase of the sensed voltage and a phase of a supply voltage at the one or more active circuits.

3. The apparatus of claim 1, wherein the filter circuit has a variable delay to delay the tuned sensed voltage.

4. The apparatus of claim 3, wherein the filter circuit comprises RC components having a variable resistance in series between the sensed voltage and the adaptive clock distribution circuit configured to vary the delay of the tuned sensed voltage.

5. The apparatus of claim 4, wherein the variable resistor is configured with a constant value based on characteristics of the one or more active circuits.

6. The apparatus of claim 4, wherein the filter circuit comprises a feedback element configured to adjust the variable resistor in response to the sensed voltage.

7. The apparatus of claim 1, wherein the adaptive clock distribution circuit is configured to detect the voltage droop by comparing the difference between the tuned sensed voltage and a supply voltage to a threshold.

8. The apparatus of claim 7, wherein the adaptive clock distribution circuit is configured to reduce the frequency after detecting a voltage droop after a predetermined number of clock cycles.

9. The apparatus of claim 1, wherein the adaptive clock distribution circuit comprises a clock divider coupled between the clock signal source and the one or more active circuits and wherein the adaptive clock distribution circuit is configured to reduce the frequency by activating the clock divider.

10. The apparatus of claim 1, wherein the adaptive clock distribution circuit further comprises a tunable length delay between the clock signal source and the one or more active circuits to stretch a period of the clock signal.

11. The apparatus of claim 1, wherein the clock signal source is a phase-locked loop.

12. A method comprising:

receiving a clock signal at an adaptive clock distribution circuit, the clock signal having a voltage and a frequency;

receiving a sensed voltage of the clock signal from one or more active circuits;

delaying the sensed voltage at a filter circuit to provide a tuned sensed voltage;

detecting a voltage droop of the tuned sensed voltage;

reducing the frequency of the clock signal in response to the detecting the voltage droop; and providing the clock signal to the one or more active circuits to drive the one or more active circuits at the voltage and the frequency.

13. The method of claim 12, wherein the delaying the sensed voltage comprises aligning a phase of the tuned sensed voltage and a phase of a supply voltage at the one or more active circuits.

14. The method of claim 12, further comprising adjusting a delay of the tuned sensed voltage.

15. The method of claim 14, wherein the adjusting the delay comprises adjusting a variable resistor.

16. The method of claim 12, wherein the detecting the voltage droop comprises comparing the difference between the tuned sensed voltage and a supply voltage to a threshold to a threshold for a predetermined number of clock cycles.

17. The method of claim 12, wherein the reducing the frequency comprises activating a clock divider at the adaptive clock distribution circuit.

18. A computing system comprising:

an integrated circuit having at least one core, the core including one or more active circuits;

a clock signal source configured to generate a clock signal for the one or more active circuits of the core, the clock signal having a voltage and a frequency;

a voltage distribution circuit coupled to the clock signal source configured to distribute the clock signal to the core;

a filter circuit coupled to the one or more active circuits to receive a sensed voltage of the clock signal from the one or more active circuits and configured to delay the sensed voltage to provide a tuned sensed voltage; and an adaptive clock distribution circuit coupled to the clock signal source to receive the clock signal and coupled to the voltage distribution circuit to provide the clock signal to the one or more active circuits, the adaptive clock distribution circuit coupled to the filter circuit to receive the tuned sensed voltage from the filter circuit, and configured to detect a voltage droop of the tuned sensed voltage with respect to the clock signal, and to reduce the frequency for the one or more active circuits in response to the voltage droop.

19. The computing system of claim 18, wherein the filter circuit comprises variable resistors and wherein the variable resistors are variable in response to the sensed voltage.

20. The computing system of claim 19, wherein the filter circuit comprises a feedback element configured to adjust the variable resistors to align a phase of the tuned sensed voltage and a phase of a supply voltage at the one or more active circuits.

* * * * *